US012268111B2

(12) United States Patent
Takase et al.

(10) Patent No.: US 12,268,111 B2
(45) Date of Patent: Apr. 8, 2025

(54) WORKING VEHICLE

(71) Applicant: KUBOTA CORPORATION, Osaka (JP)

(72) Inventors: Shunya Takase, Sakai (JP); Hiroki Suga, Sakai (JP); Shinji Misaki, Sakai (JP); Koji Matsuda, Sakai (JP); Yuto Shimizu, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 512 days.

(21) Appl. No.: 17/552,478

(22) Filed: Dec. 16, 2021

(65) Prior Publication Data

US 2022/0104422 A1 Apr. 7, 2022

Related U.S. Application Data

(63) Continuation of application No. PCT/JP2020/033251, filed on Sep. 2, 2020.

(30) Foreign Application Priority Data

Sep. 6, 2019 (JP) ................................. 2019-163355

(51) Int. Cl.
*A01B 69/04* (2006.01)
*B60N 2/75* (2018.01)
(Continued)

(52) U.S. Cl.
CPC ............ *A01B 69/008* (2013.01); *B60N 2/797* (2018.02); *B60W 10/08* (2013.01); *B60W 30/10* (2013.01);
(Continued)

(58) Field of Classification Search
CPC .... B62D 15/025; B60N 2/797; A01B 69/008; B60W 2540/223; B60W 2540/227
See application file for complete search history.

(56) References Cited

U.S. PATENT DOCUMENTS 6,876,920 B1 * 4/2005 Mailer ................... A01B 69/00
701/470
7,438,517 B2 * 10/2008 Tanaka ............... A01B 63/1013
180/315
(Continued)

FOREIGN PATENT DOCUMENTS

CN 108422996 A 8/2018
CN 207773223 U 8/2018
(Continued)

OTHER PUBLICATIONS

Official Communication issued in corresponding Indian Patent Application No. 202117058845, mailed on Jul. 8, 2022.
(Continued)

*Primary Examiner* — Paul N Dickson
*Assistant Examiner* — Tiffany L Webb
(74) *Attorney, Agent, or Firm* — Keating & Bennett, LLP

(57) ABSTRACT

A working vehicle includes an operator's seat, a vehicle body to travel selectively using either manual steering performed manually by the operator or automatic steering performed based on a position of the vehicle body detected by a position detector without manual operation by the operator, and a first operation actuator on a lateral side of the operator's seat to selectively start or terminate the automatic steering during rearward traveling of the vehicle body or to correct the position of the vehicle body during rearward traveling of the vehicle body.

6 Claims, 8 Drawing Sheets

(51) Int. Cl.
  *B60W 10/08*  (2006.01)
  *B60W 30/10*  (2006.01)
  *B62D 15/02*  (2006.01)

(52) U.S. Cl.
  CPC ..... *B62D 15/025* (2013.01); *B60W 2540/223* (2020.02); *B60W 2540/227* (2020.02)

(56) References Cited

U.S. PATENT DOCUMENTS

| | | | | |
|---|---|---|---|---|
| 7,451,030 | B2* | 11/2008 | Eglington | G05D 1/0221 |
| | | | | 701/410 |
| 9,352,673 | B2* | 5/2016 | Yasunobe | B60N 2/753 |
| 9,725,090 | B2* | 8/2017 | Komatsu | B60W 10/101 |
| 9,746,076 | B2* | 8/2017 | Kobayashi | B60K 35/10 |
| 9,759,319 | B2* | 9/2017 | Komatsu | F16H 59/02 |
| 9,943,023 | B2* | 4/2018 | Komatsu | B60Q 1/2665 |
| 10,390,473 | B2* | 8/2019 | Matsuzaki | A01B 69/00 |
| 10,660,255 | B2* | 5/2020 | Shinkai | B60K 35/00 |
| 10,736,256 | B2* | 8/2020 | Sakaguchi | B60K 35/60 |
| 11,186,312 | B2* | 11/2021 | Nishi | B62D 5/08 |
| 11,383,703 | B2* | 7/2022 | Nishi | G05D 1/0255 |
| 11,399,454 | B2* | 8/2022 | Miyashita | G05D 1/0212 |
| 11,713,078 | B2* | 8/2023 | Miyashita | B60W 60/0059 |
| | | | | 701/41 |
| 11,726,486 | B2* | 8/2023 | Hayashida | G05D 1/0061 |
| | | | | 701/50 |
| 11,871,690 | B2* | 1/2024 | Nishikubo | A01B 69/001 |
| 11,889,779 | B2* | 2/2024 | Misaki | G05D 1/227 |
| 2004/0210357 | A1* | 10/2004 | McKay | A01B 69/008 |
| | | | | 318/587 |
| 2011/0196565 | A1* | 8/2011 | Collins | G05D 1/0219 |
| | | | | 701/25 |
| 2015/0151786 | A1* | 6/2015 | Fujii | B62D 6/008 |
| | | | | 701/41 |
| 2017/0217473 | A1* | 8/2017 | Higashiguchi | B62D 1/185 |
| 2018/0206389 | A1* | 7/2018 | Sakaguchi | E02F 5/145 |
| 2018/0206391 | A1* | 7/2018 | Shinkai | G05D 1/0268 |
| 2018/0209793 | A1* | 7/2018 | Sakaguchi | G01C 21/20 |
| 2018/0299894 | A1* | 10/2018 | Takase | B60W 50/10 |
| 2018/0338407 | A1* | 11/2018 | Matsuzaki | B60T 7/18 |
| 2019/0106140 | A1* | 4/2019 | Masu | B62D 1/12 |
| 2019/0382005 | A1 | 12/2019 | Nishi et al. | |
| 2020/0383261 | A1* | 12/2020 | Miyashita | G05D 1/0212 |
| 2020/0398780 | A1* | 12/2020 | Kobayashi | B60R 21/131 |
| 2020/0406935 | A1* | 12/2020 | Yamanouchi | B60S 1/0452 |
| 2021/0105929 | A1* | 4/2021 | Miyashita | G05D 1/0061 |
| 2021/0114659 | A1* | 4/2021 | Miyashita | G05D 1/0061 |
| 2021/0120729 | A1* | 4/2021 | Miyashita | A01B 63/02 |
| 2021/0146995 | A1* | 5/2021 | Miyashita | B62D 15/025 |
| 2021/0300460 | A1* | 9/2021 | Misaki | B62D 5/0412 |
| 2021/0360843 | A1* | 11/2021 | Misaki | B62D 5/04 |
| 2022/0007563 | A1* | 1/2022 | Suga | G05D 1/0278 |
| 2022/0104422 | A1* | 4/2022 | Takase | B60W 30/10 |
| 2022/0104423 | A1* | 4/2022 | Kikumoto | A01B 69/008 |
| 2022/0105874 | A1* | 4/2022 | Takase | G01S 5/01 |
| 2022/0105875 | A1* | 4/2022 | Misaki | H01Q 1/3275 |
| 2023/0018138 | A1* | 1/2023 | Shintani | A01B 69/008 |
| 2023/0320248 | A1* | 10/2023 | Tambo | B60Q 9/00 |
| | | | | 701/41 |
| 2023/0339557 | A1* | 10/2023 | Tambo | A01B 69/007 |

FOREIGN PATENT DOCUMENTS

| | | |
|---|---|---|
| EP | 2 520 447 A1 | 11/2012 |
| JP | 2002-068006 A | 3/2002 |
| JP | 2009-095290 A | 5/2009 |
| JP | 2010-075123 A | 4/2010 |
| JP | 2017-123803 A | 7/2017 |
| JP | 2018-116609 A | 7/2018 |
| JP | 2019-127118 A | 8/2019 |
| WO | 2019/124258 A1 | 6/2019 |
| WO | 2019/124298 A1 | 6/2019 |
| WO | 2019/146381 A1 | 8/2019 |

OTHER PUBLICATIONS

Official Communication issued in International Patent Application No. PCT/JP2020/033251, mailed on Oct. 13, 2020.

Official Communication issued in corresponding Indian Patent Application No. 202117058845, mailed on Mar. 19, 2024.

Official Communication issued in corresponding Japanese Patent Application No. 2019-163355, mailed on Dec. 10, 2019.

* cited by examiner

WORKING VEHICLE

CROSS REFERENCE TO RELATED APPLICATIONS

This application is a continuation application of International Application No. PCT/JP2020/033251, filed on Sep. 2, 2020, which claims the benefit of priority to Japanese Patent Application No. 2019-163355, filed on Sep. 6, 2019. The entire contents of each of these applications are hereby incorporated herein by reference.

BACKGROUND OF THE INVENTION

1. Field of the Invention

The present invention relates to a working vehicle such as a tractor.

2. Description of the Related Art

Conventionally, the working vehicle disclosed in Japanese Unexamined Patent Publication No. 2017-123803 has been known.

The working vehicle disclosed in Japanese Unexamined Patent Publication No. 2017-123803 has a vehicle body capable of traveling using either manual steering or automatic steering, the manual steering being performed with operation by the operator and the automatic steering being automatically performed without operation by the operator.

SUMMARY OF THE INVENTION

In the working vehicle disclosed in Japanese Unexamined Patent Publication No. 2017-123803, an operation actuator to perform an operation relating to automatic steering is disposed in the vicinity of the steering wheel forward of the operator's seat. Thus, there is a problem that it is difficult to perform operation relating to automatic steering when the operator looks rearward to perform a work.

Preferred embodiments of the present invention provide working vehicles in each of which the operator can easily perform an operation relating to automatic steering even while looking rearward.

A working vehicle according to one aspect of a preferred embodiment of the present invention may include an operator's seat on which an operator sits, a vehicle body to travel selectively using either manual steering performed manually by the operator or automatic steering performed based on a position of the vehicle body detected by a position detector without manual operation by the operator, and a first operation actuator on a lateral side of the operator's seat to selectively start or terminate the automatic steering during rearward traveling of the vehicle body or to correct the position of the vehicle body during rearward traveling of the vehicle body.

Also, a working vehicle working vehicle according to one aspect of a preferred embodiment of the present invention may further include a second operation actuator in front of the operator's seat to perform the same function as that of the first operation actuator.

Also, a working vehicle working vehicle according to one aspect of a preferred embodiment of the present invention may further include a console disposed on a lateral side of the operator's seat, and an armrest between the console and the operator's seat, wherein the first operation actuator is on an upper portion of the console and at a position higher than the armrest.

Also, the first operation actuator may be outward in a vehicle width direction from a fore-and-aft central portion of the armrest or a vicinity thereof.

Also, the first operation actuator may be operable by the operator sitting on the operator's seat with his/her elbow on the armrest.

Also, the first operation actuator may be rearward relative to a front end of the operator's seat and forward relative to a rear end of the operator's seat.

Also, the second operation actuator may be on an opposite side of a central portion of the operator's seat relative to the first operation actuator.

Also, the first operation actuator may be operable to selectively start or terminate the automatic steering during forward traveling of the vehicle body or to correct the position of the vehicle body during forward traveling of the vehicle body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
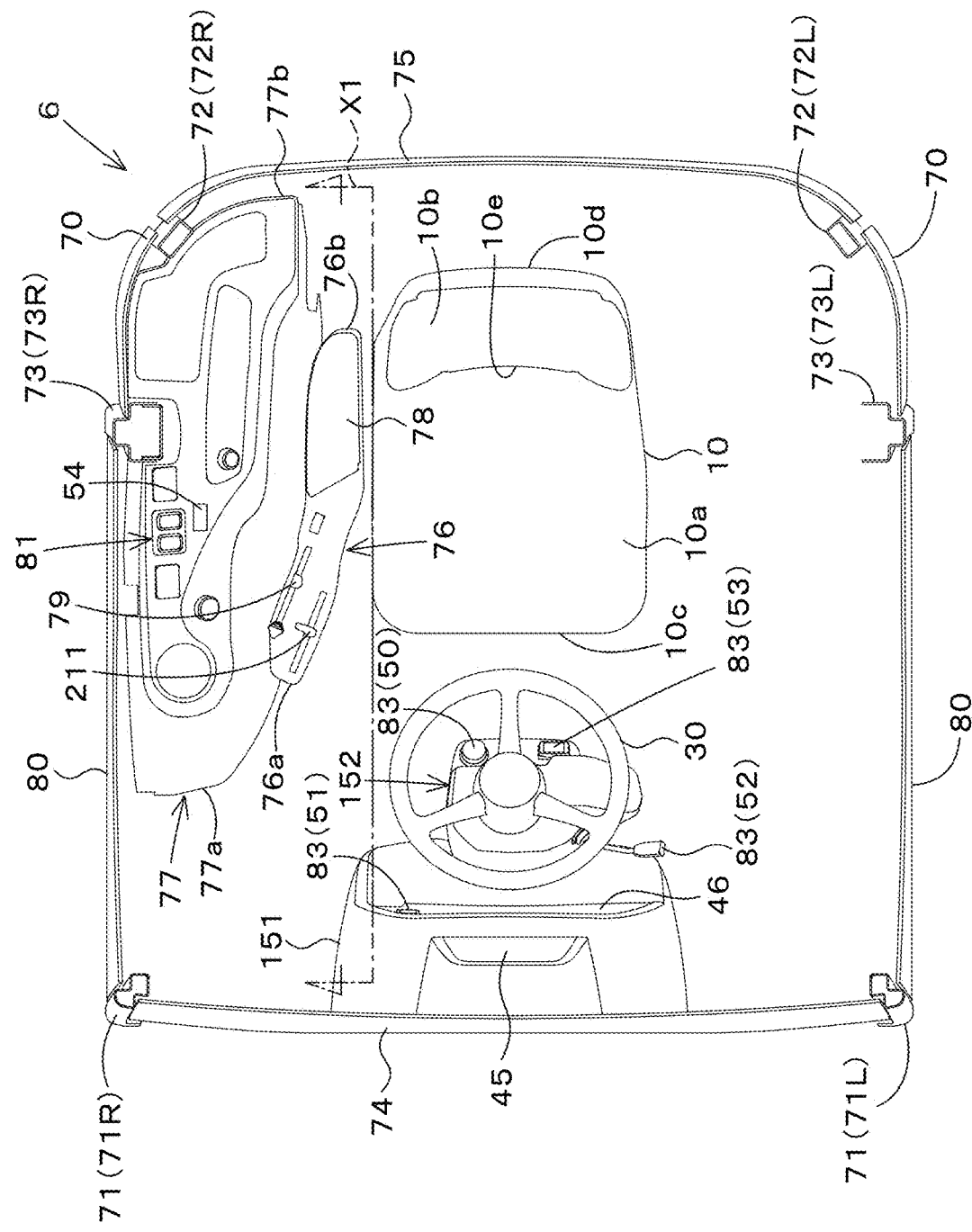
FIG. 1 is a plan view of a cabin and the interior of the cabin.

Preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

In the following, preferred embodiments of the present invention are described with reference to the drawings as appropriate.

Figure 8:
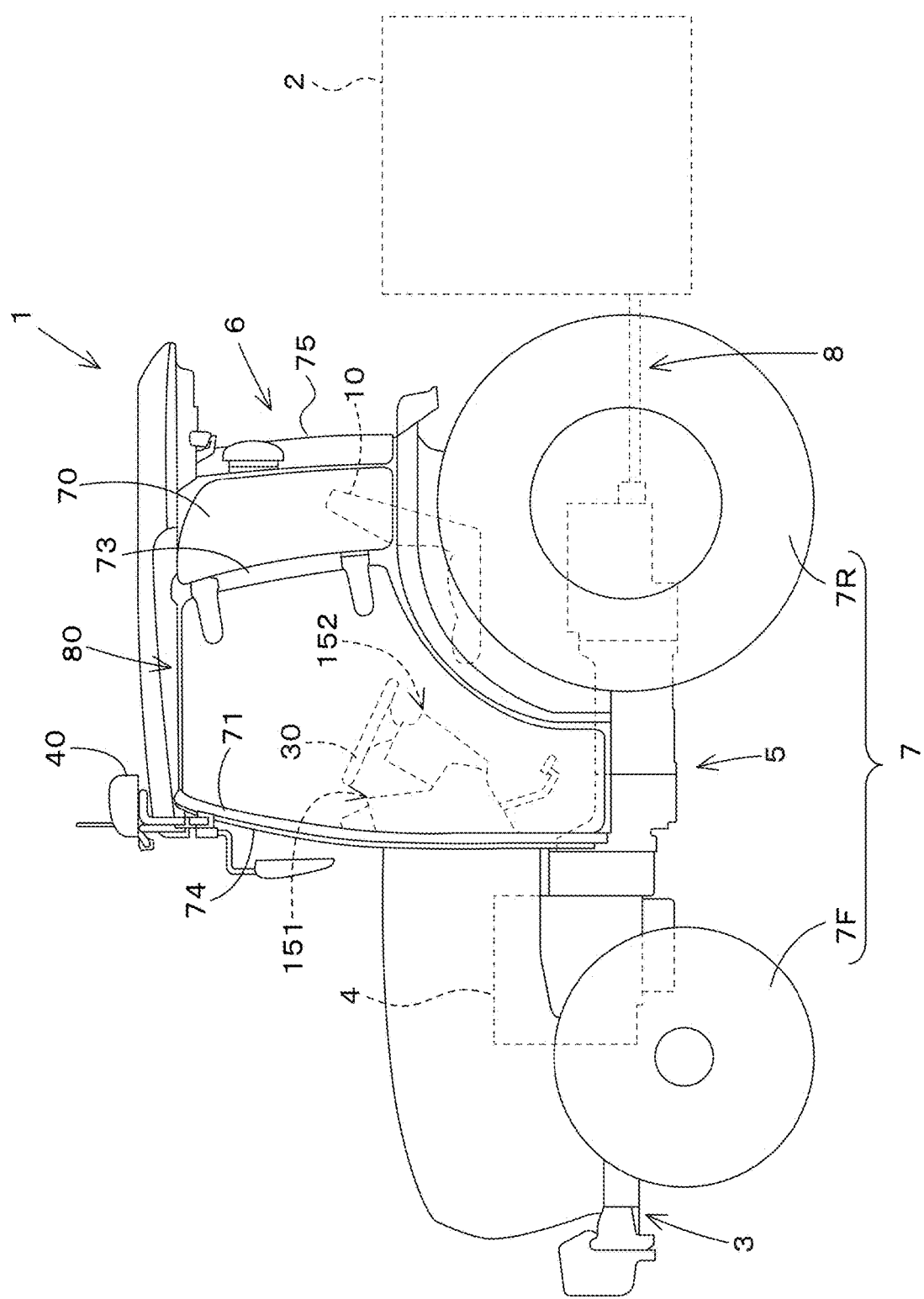
FIG. 8 is a side view of the tractor.

FIG. 8 is a side view depicting a preferred embodiment of a working vehicle 1. In the present preferred embodiment, the working vehicle 1 is a tractor. However, the working vehicle 1 is not limited to a tractor but may be an agricultural machine (agricultural vehicle), such as a combine or a transplanter, or may be a construction machine (construction vehicle) such as a loader, or the like.

With reference to FIG. 8 and so forth, the tractor (working vehicle) 1 is described. In the following, description is made by taking a front side of an operator sitting on an operator's seat 10 of the tractor 1 as forward, a rear side of the operator as rearward, a left side of the operator as leftward, and a right side of the operator as rightward. Also, description is made by taking a horizontal direction, which is a direction orthogonal to a fore-and-aft direction of the working vehicle 1, as a vehicle body width direction. Also, description is made by taking a direction from a central portion toward a right portion or a left portion of the tractor 1 in the vehicle body width direction as outward in a vehicle width direction. In other words, the outward in the vehicle width direction is one vehicle body width direction away from the width directional center of the tractor 1. A direction opposite to outward in the width direction is described as inward in the vehicle width direction. In other words, the inward in the vehicle width direction is the other vehicle body width direction approaching the width directional center of the tractor 1.

As depicted in FIG. 8, the tractor 1 includes a vehicle body 3, a prime mover 4, a transmission 5. The vehicle body 3 includes a traveling device 7 and is capable of traveling. The traveling device 7 includes front wheels 7F and rear wheels 7R. The front wheels 7F may be of a tire type or a crawler type. Also, the rear wheels 7R may be of a tire type or a crawler type.

The prime mover 4 is a diesel engine, electric motor, or the like and, in this preferred embodiment is a diesel engine. The speed shifter 5 is capable of switching the driving force of the traveling device 7 by speed shifting, and is also capable of switching between forward traveling and rearward traveling of the traveling device 7. A cabin 6 is mounted on the vehicle body 3. Also, the operator's seat 10 is provided on the vehicle body 3. The operator's seat 10 is disposed at a rear portion of the cabin interior. A steering wheel 30 is provided forward of the operator's seat 10.

Also, a coupling portion 8 is provided at a rear portion of the vehicle body 3 and includes a three-point linkage mechanism or the like. The working device 2 is attachable to and detachable from the coupling portion 8. By coupling the working device 2 to the coupling portion 8, the working device 2 can be towed by the vehicle body 3. The working device 2 is a tiller for tilling, a fertilizer spreader for spreading fertilizer, an agricultural chemical spreader for spreading agricultural chemicals, a harvester for harvesting, a mower for mowing grass or the like, a ridger for ridging, or the like, and is a device for performing a work (ground work) on a land such as an agricultural field.

Figure 5:
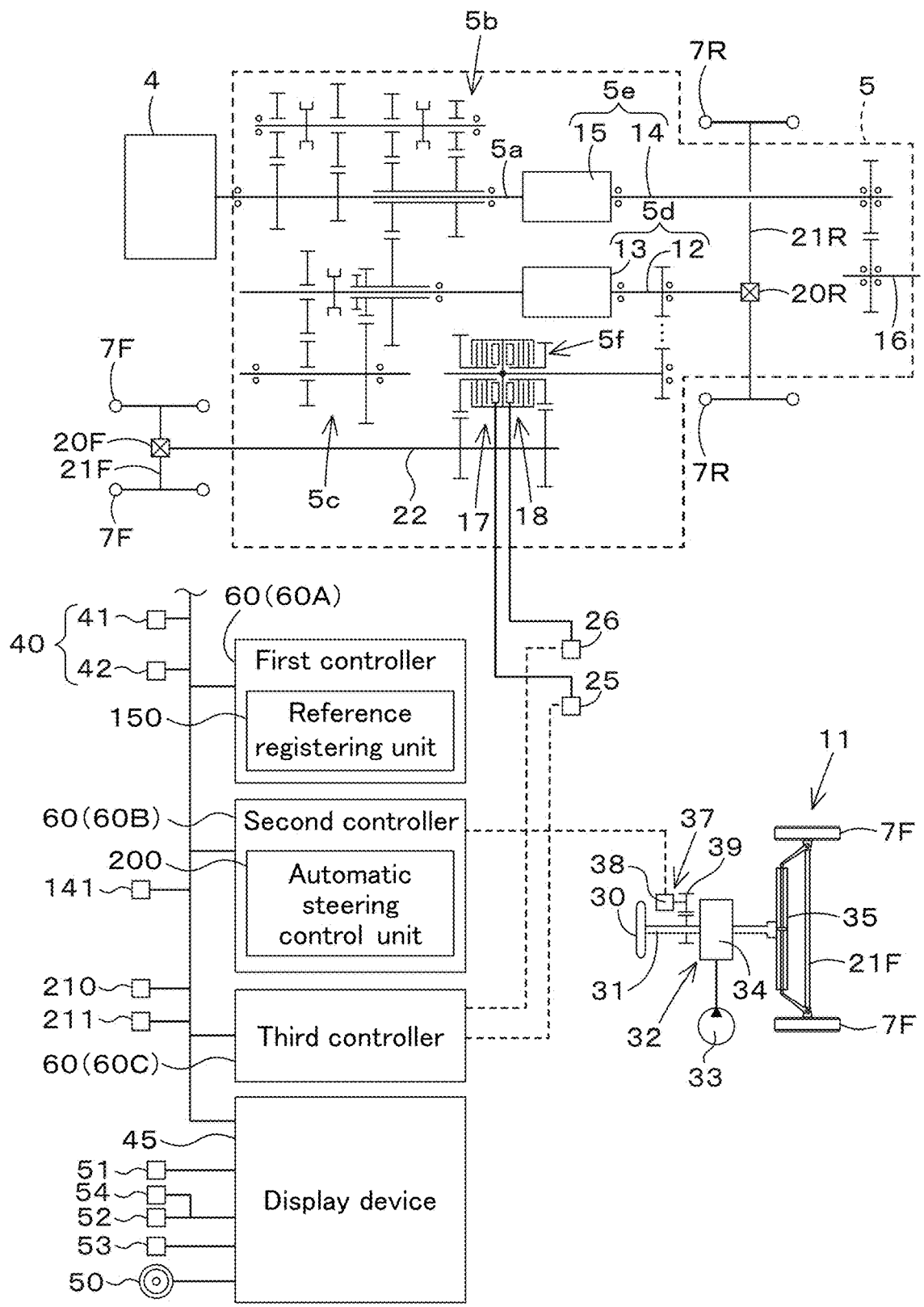
FIG. 5 is a diagram depicting the structure of a tractor and a control block diagram.

As depicted in FIG. 5, the transmission 5 includes a main shaft (propeller shaft) 5a, a main speed shifting unit 5b, a sub-speed shifting unit 5c, a shuttle unit 5d, a PTO power transmission unit 5e, and a front speed shifting unit 5f. The propeller shaft 5a is rotatably supported by a housing case (transmission case), and power from the crank shaft of the prime mover 4 is transmitted to the propeller shaft 5a. The main speed shifting unit 5b includes a plurality of gears and a shifter for changing connection of the gears. By changing the connection (engagement) of the plurality of gears as appropriate with the shifter, the main speed shifting unit 5b changes and outputs rotation inputted from the propeller shaft 5a (changes speed).

Similar to the main speed shifting unit 5b, the sub-speed shifting unit 5c includes a plurality of gears and a shifter for changing connection of the gears. By changing the connection (engagement) of the plurality of gears as appropriate with the shifter, the sub-speed shifting unit 5c changes rotation speed and outputs the speed-changed rotation inputted from the main speed shifting unit 5b.

The shuttle unit 5d includes a shuttle shaft 12 and a forward-rearward traveling switching unit 13. The power outputted from the sub-speed shifting unit 5c is transmitted to the shuttle shaft via gears and the like. The forward-rearward traveling switching unit 13 includes, for example, a hydraulic clutch or the like, which is clutched on and off to switch the rotating direction of the shuttle shaft 12, that is, set whether forward traveling or rearward traveling of the tractor 1. The shuttle shaft 12 is connected to a rear-wheel differential device 20R. The rear-wheel differential device 20R rotatably supports rear axles 21R to which the rear wheels 7R are attached.

The PTO power transmission unit 5e includes a PTO propeller shaft 14 and a PTO clutch 15. The PTO propeller shaft 14 is rotatably supported, and is capable of transmitting power from the propeller shaft 5a. The PTO propeller shaft 14 is connected to a PTO shaft 16 via gears or the like. The PTO clutch 15 is, for example, a hydraulic clutch or the like, which is configured to be engaged and disengaged to switch a transmission state between a state of transmitting power of the propeller shaft 5a to the PTO propeller shaft 14 and a state of not transmitting power of the propeller shaft 5a to the PTO propeller shaft 14.

The front speed shifting unit 5f includes a first clutch 17 and a second clutch 18. The first clutch 17 and the second clutch 18 are capable of transmitting power from the propeller shaft 5a and power from the shuttle shaft 12 is transmitted via gears and a line shaft. Power from the first clutch 17 and the second clutch 18 can be transmitted via a front line shaft 22 to a front axle shaft 21F. Specifically, the front line shaft 22 is connected to a front-wheel differential device 20F, and the front-wheel differential device 20F rotatably supports the front axle shafts 21F to which the front wheels 7F are attached.

The first clutch 17 and the second clutch 18 are hydraulic clutches or the like. A fluid passage connected to the first clutch 17 is connected to a first actuation valve 25 which is supplied with hydraulic fluid delivered from a hydraulic pump 33. The first clutch 17 is switched between a clutch-on state and a clutch-off state depending on the opening degree of the first actuation valve 25. A fluid passage connected to the second clutch 18 is connected to a second actuation valve 26. The second clutch 18 is switched between a clutch-on state and a clutch-off state depending on the opening degree of the second actuation valve 26. The first actuation valve 25 and the second actuation valve 26 are, for example, solenoid two-position change-over valves having solenoids each of which is excited and unexcited to switch the corresponding first or second actuation valve 25 or 26 between the clutch-on state and the clutch-off state.

When the first clutch 17 is in the clutch-off state and the second clutch 18 is in the clutch-on state, power of the shuttle shaft 12 is transmitted via the second clutch 18 to the front wheels 7F. This makes a four-wheel drive (4WD) mode in which the front wheels 7F and the rear wheels 7R are driven by the driving power, and the rotation speeds of the front wheels 7F and the rear wheels 7R are equal or substantially equal to each other (an equal-speed 4WD state). On the other hand, when the first clutch 17 is in the clutch-on state and the second clutch 18 is in the clutch-off state, the vehicle is set in a four-wheel drive mode in which the rotation speed of the front wheels 7F becomes faster than the rotation speed of the rear wheels 7R (am acceleration 4WD state). Also, when the first clutch 17 and the second clutch 18 are in the clutch-off state, power of the shuttle shaft 12 is not transmitted to the front wheels 7F, and thus the vehicle is set in a two-wheel drive (2WD) mode in which only the rear wheels 7R are driven by the driving power.

As depicted in FIG. 5, the tractor 1 includes a positioning device 40 (position detector). The positioning device 40 is capable of detecting its own position (positioning information including latitude and longitude) with a satellite positioning system (positioning satellite) such as D-GPS, GPS, GLONASS, HOKUTO, GALILEO, and MICHIBIKI. That is, the positioning device 40 receives a satellite signal transmitted from the positioning satellite (such as the position of the positioning satellite, transmission time, and correction information), and detects the position (for example, latitude and longitude) based on the satellite signal. The positioning device 40 includes a receiver 41 and an inertial measurement unit (IMU: Inertial Measurement Unit) 42. The receiver 41 is a device having an antenna or the like to receive satellite signals transmitted from the positioning satellite, and is attached to the vehicle body 3 separately from the inertial measurement unit 43. In this preferred embodiment, the receiver 41 is disposed above the roof of the cabin 6 and is attached to the cabin 6 via a supporting component. Note that the attachment location of the receiver 41 is not limited by the present preferred embodiment.

The inertial measurement unit 42 includes an acceleration sensor to detect acceleration, a gyro sensor to detect angular velocity, and so forth. The vehicle body 3 is provided, for example, below the steering wheel 30, below the operator's seat 10, or the like. By the inertial measurement unit 42, the roll angle, pitch angle, yaw angle, and so forth of the vehicle body 3 can be detected.

As depicted in FIG. 5, the tractor 1 includes a steering device 11. The steering device 11 is a device capable of performing manual steering of the vehicle body 3 with steering operation by the operator and automatic steering of the vehicle body 3 without steering operation by the operator. Therefore, the vehicle body 3 is capable of traveling by using either manual steering with steering operation by the operator or automatic steering without steering operation by the operator.

The steering device 11 has the steering wheel 30 and a steering shaft (rotation shaft) 31 rotatably supporting the steering wheel 30. Also, the steering device 11 includes an assist mechanism (power steering device) 32. The assist mechanism 32 assists the rotation of the steering shaft 31 (steering wheel 30) with hydraulic pressure or the like. The assist mechanism 32 includes the hydraulic pump 33, a control valve 34 to which a hydraulic fluid delivered from the hydraulic pump 33 is supplied, and a steering cylinder 35 which is actuated by the control valve 34. The control valve 34 is, for example, a three-position change-over valve that is switchable with the movement of a spool or the like, and is switched in accordance with the steering direction (rotating direction) of the steering shaft 31. The steering cylinder 35 is connected to an arm (knuckle arm) to change the orientation of the front wheels 7F.

Therefore, when the operator holds and operates the steering wheel 30 in one direction or the other direction, the switching position and the opening degree of the control valve 34 are switched in accordance with the rotating direction of the steering wheel 30 and, with the steering cylinder 35 extending or contracting to left or right in accordance with the switching position and the opening degree of the control valve 34, the steering direction of the front wheels 7F can be changed. That is, in the vehicle body 3, the forwarding direction can be changed to left or right by manual steering of the steering wheel 30.

As depicted in FIG. 5, the steering device 11 includes an automatic steering mechanism 37. The automatic steering mechanism 37 is a mechanism for automatic steering of the vehicle body 3, automatically steering the vehicle body 3 based on the position of the vehicle body 3 (vehicle-body position) detected by the positioning device 40. The automatic steering mechanism 37 includes a steering motor 38 and a gear mechanism 39. The steering motor 38 is a motor capable of controlling the rotating direction, rotation speed and rotation angle, and so forth based on the vehicle-body position. The gear mechanism 39 includes a gear, which is provided on the steering shaft 31 to rotate together with the steering shaft 31, and a gear, which is provided on the rotation shaft of the steering motor 38 to rotate together with the rotation shaft. When the rotation shaft of the steering motor 38 rotates, the steering shaft 31 is automatically rotated (revolved) via the gear mechanism 39 to change the steering direction of the front wheels 7F so that the vehicle-body position matches a scheduled traveling line L2 (refer to FIG. 6).

Figure 6:
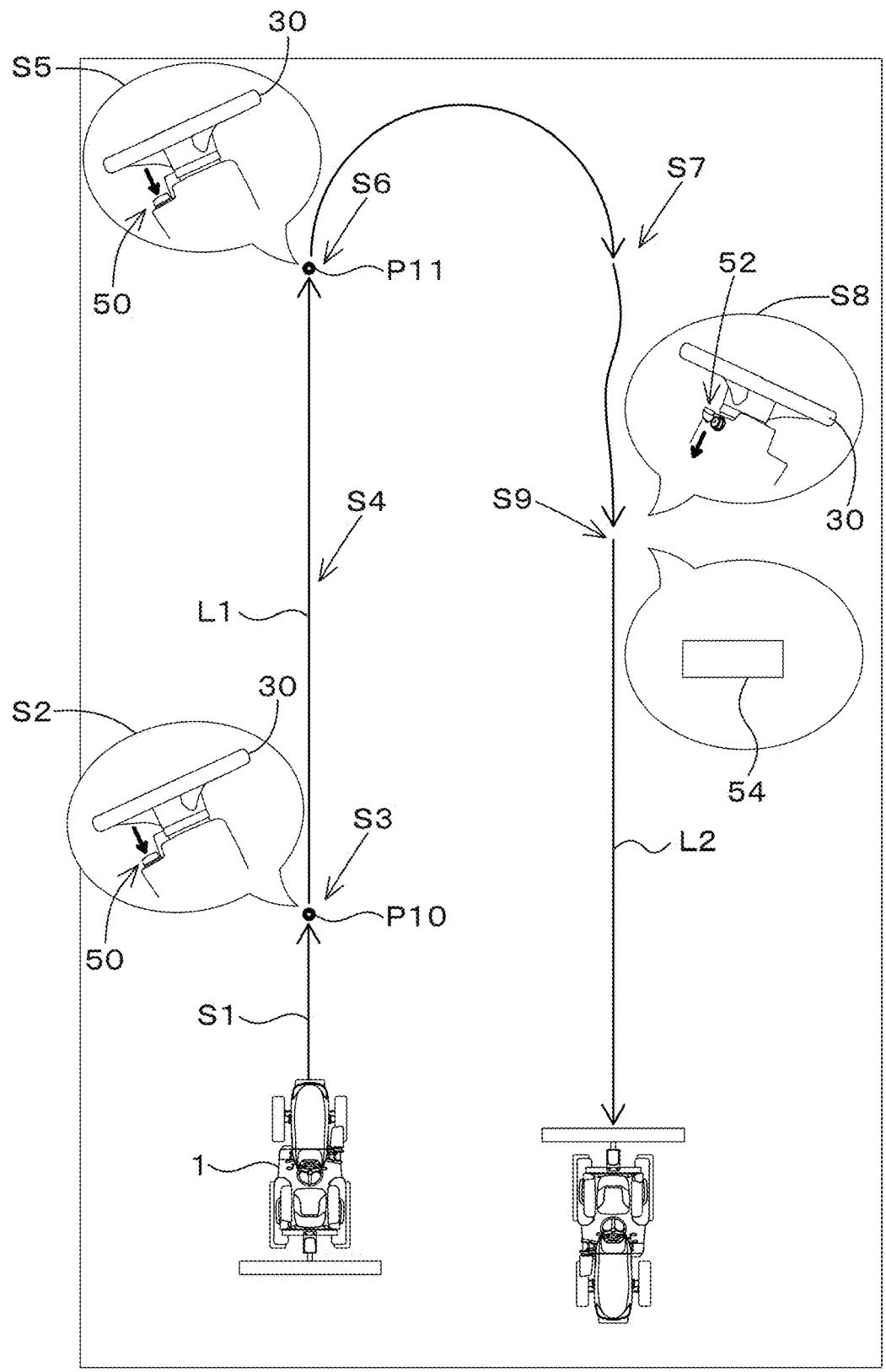
FIG. 6 is a descriptive diagram for describing automatic steering.

As depicted in FIG. 6, to perform automatic steering, a traveling reference line L1 is first set by a multi switch 50 before performing automatic steering. After the traveling reference line L1 is set, the scheduled traveling line L2 parallel or substantially parallel to the traveling reference line L1 is set, thus allowing automatic steering to be performed. In automatic steering, steering of the tractor 1 (vehicle body 3) in the forwarding direction is automatically performed so that the vehicle-body position measured by the positioning device 40 matches the scheduled traveling line L2.

As depicted in FIG. 1, the cabin 6 includes a plurality of front pillars 71, rear pillars 72, and quarter pillars (center pillars) 73. The plurality of front pillars 71 include a first front pillar 71L and a second front pillar 71R disposed at a front portion of the cabin 6 so as to be spaced in a machine width direction. The plurality of rear pillars 72 include a first rear pillar 72L and a second rear pillar 72R disposed at a rear portion of the cabin 6 so as to be spaced in the machine width direction. The plurality of quarter pillars 73 include a first quarter pillar 73L and a second quarter pillar 73R disposed between the front pillars 71 and the rear pillars 72 and spaced from each other in the machine width direction. A front glass 74 is provided between the first front pillar 71L and the second front pillar 71R. A rear glass 75 is provided between the first rear pillar 72L and the second rear pillar 72R. Loading/unloading doors 80 are provided between the front pillars 71 and the quarter pillars 73. Rear side glasses 70 are provided between the quarter pillars 73 and the rear pillars 72.

The operator's seat 10 includes a seat portion 10a on which the operator sits and a backrest portion 10b which the operator sits with his/her back against. On a lateral side (rightward) of the operator's seat 10, an armrest 76 and a console 77 are disposed so as to be aligned laterally. The armrest 76 is disposed between the console 77 and the operator's seat 10. The armrest 76 has an armrest portion 78 at a rear portion thereof. The armrest 76 is provided at a front portion thereof with a position lever 79 to raise and lower the working device 2 and a speed-shift member 211 to perform operation of changing a speed stage of the transmission 5. The console 77 is an interior cover formed as a part of the interior of the cabin 6. Various switches 81 are disposed on the console 77.

Figure 2:
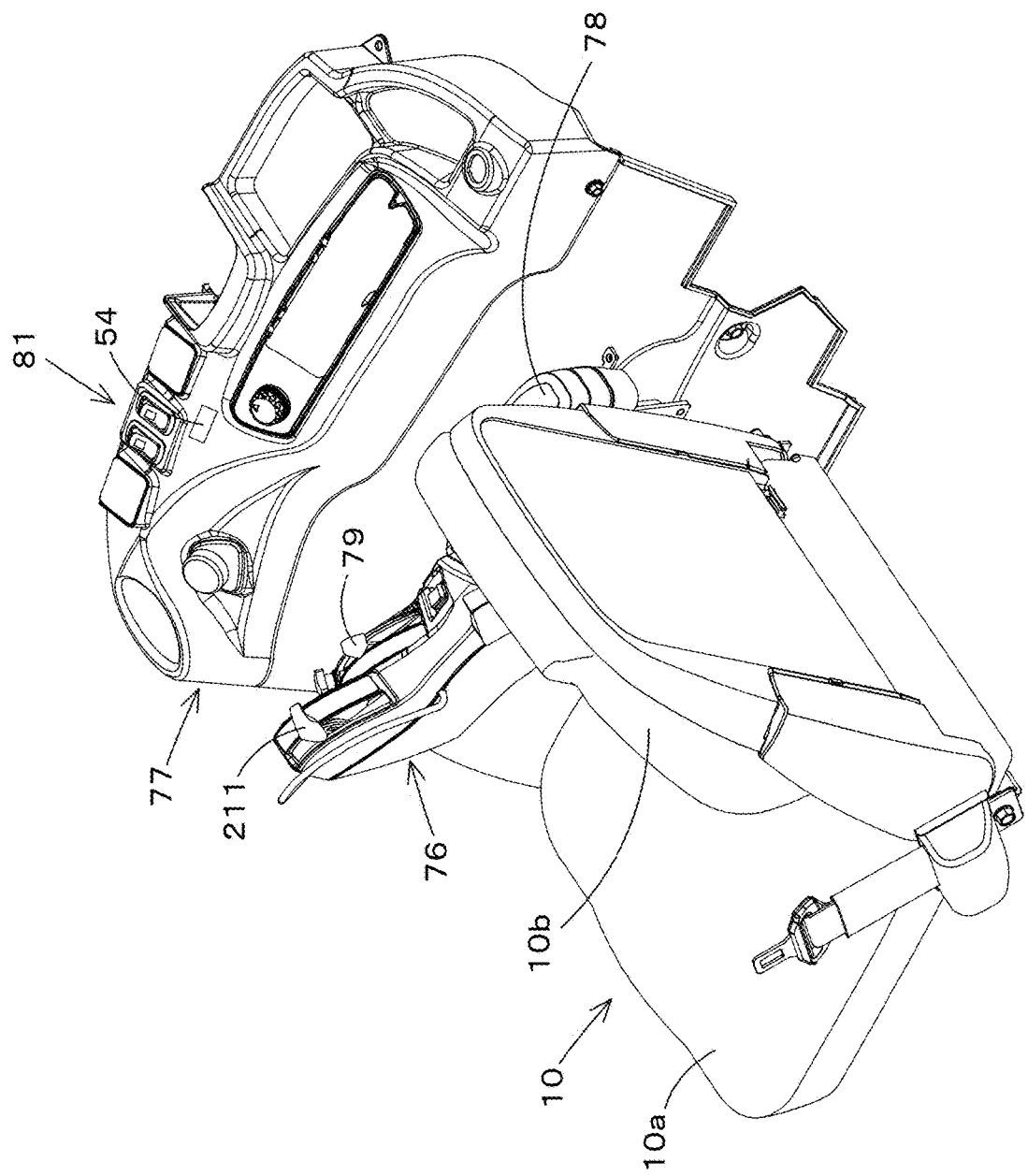
FIG. 2 is a perspective view of an operator's seat, a console, and so forth.
Figure 3:
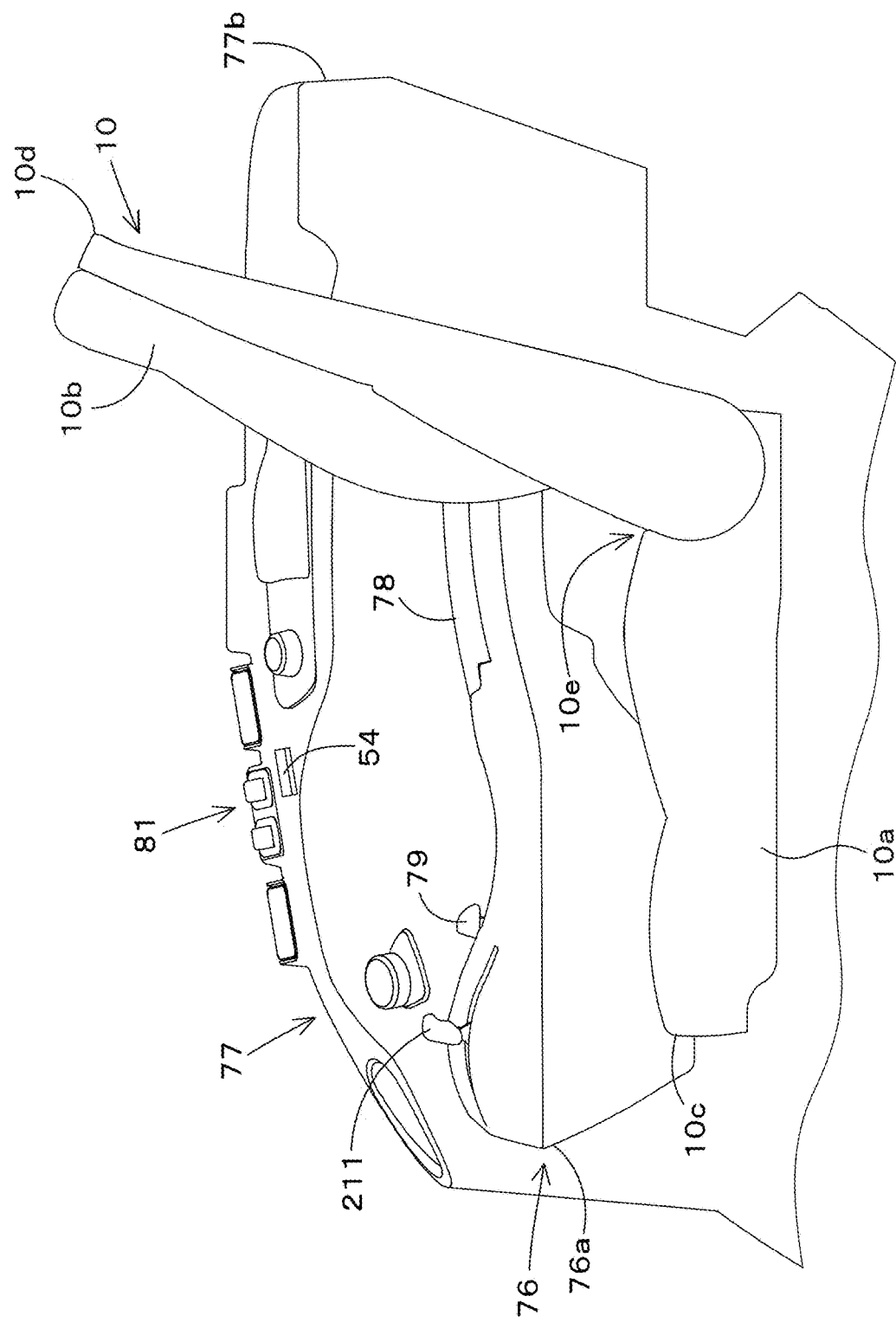
FIG. 3 is a side view of the operator's seat, the console, and so forth.

As depicted in FIG. 1 to FIG. 3, on the lateral side of the operator's seat 10, a first operation actuator 54 to perform an operation relating to automatic steering is disposed. The lateral side of the operator's seat 10 is, as indicated by a one-dot-chain line X1 in FIG. 1, a outward side relative to the operator's seat 10 in the vehicle width direction. In the present preferred embodiment, the first operation actuator 54 is disposed rightward of the operator's seat 10. Note that the first operation actuator 54 may be disposed leftward of the operator's seat 10.

As depicted in FIG. 1, the first operation actuator 54 is disposed on the console 77. The console 77 includes a front portion positioned outward of the steering wheel 30 in the vehicle width direction and a rear end portion positioned rearward relative to the second rear pillar 72R and in the vicinity of the rear glass 75. The first operation actuator 54 is disposed between a front end 77a and a rear end 77b of the console. In the present preferred embodiment, the first operation actuator 54 is disposed in the vicinity of the fore-and-aft center (including the center, and the same goes for the following) of the console 77. On an assumption that the member includes, for example, a front portion, a rear portion, and an intermediate portion between the front portion and the rear portion, the vicinity of the center is a portion corresponding to the intermediate portion. Note that the first operation actuator 54 may be disposed at a front portion or a rear portion of the console 77.

As depicted in FIG. 3, the first operation actuator 54 is disposed on an upper portion of the console 77. In detail, the first operation actuator 54 is disposed on an upper surface side of the console 77. Note that the first operation actuator 54 may be disposed on a surface on an inner side of the console 77 in the vehicle width direction. Also, the upper portion of the console 77 is at a position higher than the seat portion 10a and higher than the armrest 76. That is, the first operation actuator 54 is disposed above the seat portion 10a and above the armrest 76.

As depicted in FIG. 1, the first operation actuator 54 is disposed rearward relative to a front end (front end of the seat portion 10a) 10c of the operator's seat 10 and forward relative to a rear end 10d (rear end of the backrest portion 10b) of the operator's seat 10. In detail, the first operation actuator 54 is disposed rearward relative to the front end 10c of the operator's seat 10a and forward relative to a rear end 10e of the seat portion 10a. In the present preferred embodiment, the first operation actuator 54 is positioned outward in the vehicle width direction (rightward) from a portion in the vicinity of the fore-and-aft center of the seat portion 10a. Note that the first operation actuator 54 may be disposed outward in the vehicle width direction of a front portion of the seat portion 10a or outward in the vehicle width direction of a rear portion of the seat portion 10a. Also, the first operation actuator 54 may be disposed forward from the operator's seat 10 or rearward from the operator's seat 10.

As depicted in FIG. 1, the armrest 76 is disposed rearward relative to a front end 77a of the console 77 and forward relative to a rear end 77b of the console 77. A front end 76a of the armrest 76 is positioned forward relative to the front end 10c of the seat portion 10a, and a rear end 76b of the armrest 76 is positioned outward in the vehicle width direction of a lower portion of the backrest portion 10b. The first operation actuator 54 is disposed outward in the vehicle width direction of the armrest 76. In detail, the first operation actuator 54 is disposed outward in the vehicle width direction (rightward) from a portion the vicinity of the fore-and-aft center of the armrest 76. The armrest portion 78 extends from a rear portion of the armrest 76 to the vicinity of the fore-and-aft center thereof.

Note that the first operation actuator 54 may be provided on the armrest 76. In this case, the first operation actuator 54 is disposed forward relative to the armrest portion 78 and on an upper surface side of the armrest 76. This is not meant to be restrictive.

By the operator gripping the steering wheel 30 with one hand (left hand), the first operation actuator 54 is operable with the other hand (right hand). Also, the first operation actuator 54 is operable by the operator sitting on the operator's seat 10 even in a state where the operator puts his or her elbow on the armrest portion 78 of the armrest 76. This allows the operator to easily operate the first operation actuator 54.

The first operation actuator 54 is, in the present preferred embodiment, a first steering switching member which either starts or terminates automatic steering. Also, the first steering switching member 54 is a switch to be switched between a manual steering position and an automatic steering position. The first steering switching member 54 is formed of, for example, an ON/OFF switch such as a push button switch or seesaw switch, which is configured to output a signal of start of automatic steering when undergoing ON operation (turn-on operation) and outputting a termination of automatic steering when undergoing OFF operation (turn-off operation). That is, an automatic steering function becomes active by turn-on operation of the first steering switching member 54, and the automatic steering function becomes not active by turn-off operation of the first steering switching member 54 to enable manual steering.

Note that the automatic steering function is active when a mode switch 51, which will be described further below, is turned on and operated, and is not active even with turn-on operation of the first steering switching member 54 when the mode switch 51 is turned off.

Since the first steering switching member 54 is disposed on the lateral side of the operator's seat 10, the operation of start or termination of automatic steering can be easily performed when the operator faces forward to perform a work, and also when the operator looks rearward to perform a work. Also, when a ground work is performed, this may be performed in one way (in one direction without swiveling at 180 degrees). In this case, during rearward traveling by automatic steering when the operator looks rearward, the operator can easily perform an operation of starting or terminating automatic steering with the first steering switching member 54.

Figure 4:
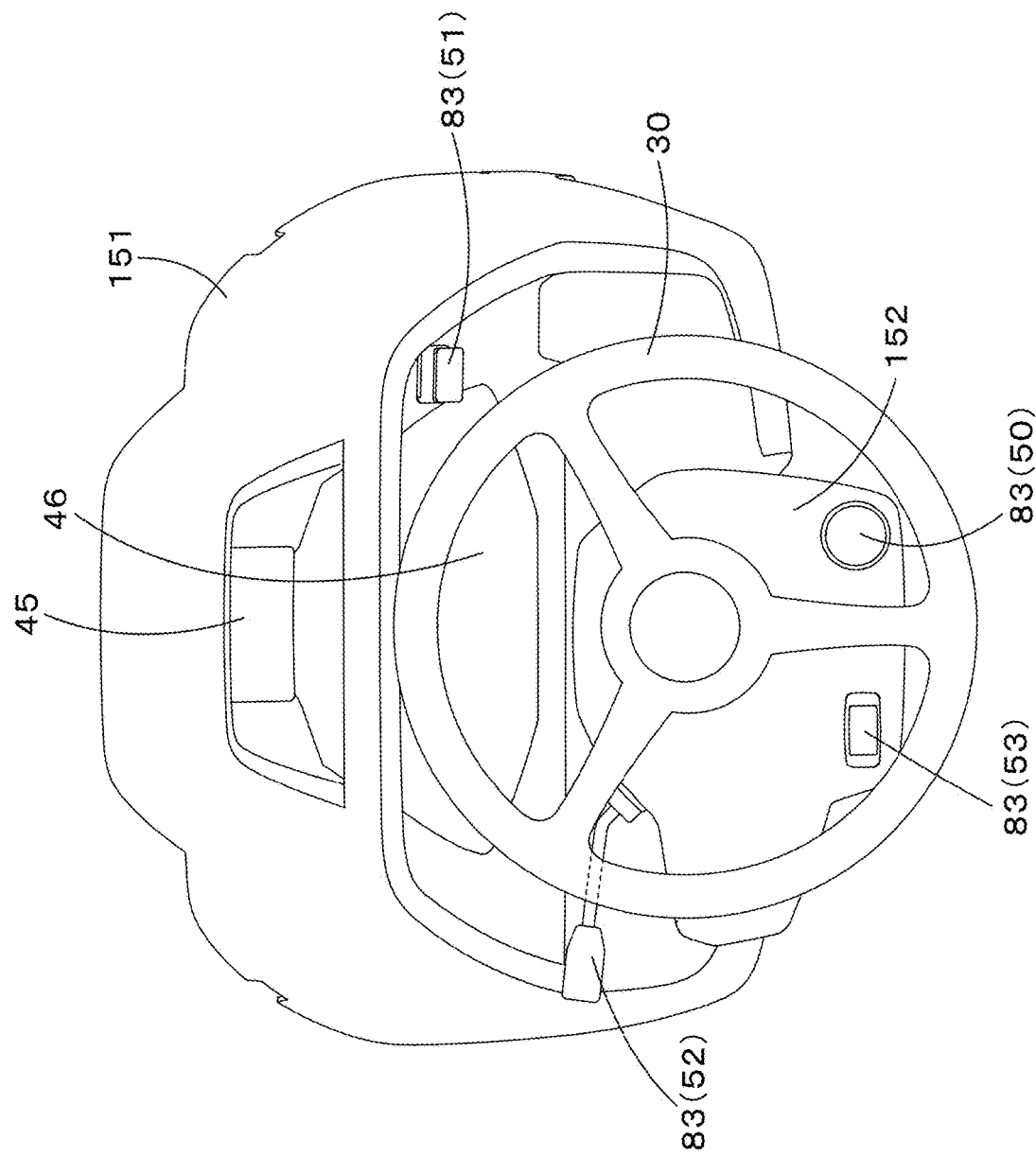
FIG. 4 is a back view of the vicinity of a steering wheel.

As depicted in FIG. 1, a front cover (operation console cover) 151 and a steering column 152 are disposed forward of the operator's seat 10. As depicted in FIG. 4, the front cover 151 is provided with a display (automatic steering monitor) 45 and a meter panel 46. The display 45 is capable of displaying various information regarding the tractor 1 (at least driving information regarding driving of the tractor 1). Also, by using the display 45, it is possible to set a work type, which is a type of the working device 2; a work width, which is the width of the working device 2; a wrap width, which is an overlap width of an adjacent worked land, and so forth. The meter panel 46 is capable of displaying the driving information such as fuel, water temperature, engine rotation speed, and so forth.

As depicted in FIG. 1, a plurality of second operation actuators 83 to perform an operation relating to automatic steering are provided forward of the operator's seat 10. The plurality of second operation actuators 83 are disposed in the vicinity of the steering wheel 30. As depicted in FIG. 4, the plurality of second operation actuators 83 include a second steering switching member 52, the mode switch 51, the multi switch 50, and a correction switch 53. The second steering switching member 52, the multi switch 50, and the correction switch 53 are disposed on the steering column 152, and the mode switch 51 is disposed on the front cover 151.

The second steering switching member 52 is an operation actuator having a function identical to a function of the first steering switching member 54. That is, the second steering switching member 52 is a switch which selectively starts or terminates automatic steering. Therefore, starting and terminating automatic steering (switching between manual steering and automatic steering) can be performed with either of the first steering switching member 54 and the second steering switching member 52. The second steering switching member 52 is a lever-type switch movable between two positions in a vertical direction, and outputs a signal for start of automatic steering when switched downward (undergoing ON operation) and outputs a signal for termination of automatic steering when switched upward (undergoing OFF operation).

Note that the automatic steering function is not active even with turn-on operation of the second steering switching member 52 when the mode switch 51 undergoes turn-off operation.

As depicted in FIG. 1, the second steering switching member 52 is disposed forward of a left portion of the operator's seat 10. That is, the second steering switching member 52 is disposed on a side opposite to the first operation actuator 54 with respect to a vehicle body width directional central portion of the operator's seat.

Therefore, while the operator can easily perform the operation of the second steering switching member 52 with the left hand, since the first steering switching member 54 is disposed rightward of the operator's seat 10, the operator can easily perform the operation of the first steering switching member 54 with the right hand. That is, the operator can easily perform operations of start and termination of automatic steering with either of the left hand and the right hand. Also, the operations of start and termination of automatic steering can be performed with either of the first steering switching member 54 and the second steering switching member 52 for automatic steering at the time of forward traveling and automatic steering at the time of rearward traveling, thus allowing various orientations and states of the operator to be supported.

The mode switch 51 is a switch to enable an operation relating to automatic steering. Specifically, the mode switch 51 is a switch to enable setting (registration) of the traveling reference line L1 with the multi switch 50 and the function (automatic steering function) of the first steering switching member 54 and the second steering switching member 52. In detail, the mode switch 51 is switchable ON and OFF, so that the mode switch 51 outputs a signal to enable setting of the traveling reference line L1 with the multi switch 50 and the function of the first steering switching member 54 and the second steering switching member 52 when being switched ON (undergoing turn-on operation) and outputs a signal to disable setting of the traveling reference line L1 with the multi switch 50 and the function of the first steering switching member 54 and the second steering switching member 52 when being switched OFF (undergoing turn-off operation).

The multi switch 50 is a switch which allows a revolving operation and a push operation. The multi switch 50 is connected to the display device 45, and can operate the display 45 when the mode switch 51 does not undergo turn-on operation. For example, any of various functional items can be selected by revolving (performing revolving operation of) the multi switch 50, and the selected item can be executed by pushing (performing push operation of) the multi switch 50.

Also, when the mode switch 51 is undergoing turn-on operation, the traveling reference line L1 can be set with the multi switch 50. In detail, as depicted in FIG. 6, the multi switch 50 outputs a signal to set of a start point P10 of the traveling reference line L1 with a first push operation, and outputs a signal to set of an end point P11 of the traveling reference line L1 with a second push operation. That is, the multi switch 50 also defines and functions as a registration switch to set a start position (start point P10) and an end position (end point P11) of the traveling reference line L1.

Here, with reference to FIG. 6, a method of setting the traveling reference line L1 and switching of the automatic steering are described. To set the traveling reference line L1, before performing automatic steering, when the tractor 1 (vehicle body 3) is first moved to a predetermined position in an agricultural field (S1) and the operator operates the multi switch 50 provided on the tractor 1 at the predetermined position (S2), the vehicle-body position measured by the positioning device 40 is set as the start point P10 of the traveling reference line L1 (S3). Next, when the tractor 1 (vehicle body 3) is moved from the start point P10 of the traveling reference line L1 (S4) and the operator operates the multi switch 50 at a predetermined position (S5), the vehicle-body position measured by the positioning device 40 is set as the end point P11 of the traveling reference line L1 (S6). Therefore, a straight line connecting the start point P10 and the end point P11 is set as the traveling reference line L1.

After the traveling reference line L1 is set (after S6), for example, when the tractor 1 (vehicle body 3) is moved to a location different from the location where the traveling reference line L1 is set (S7) and the operator performs turn-on operation of the first steering switching member 54 or the second steering switching member 52 (S8), the scheduled traveling line L2 is set, which is a straight line parallel to the traveling reference line L1 (S9). After the scheduled traveling line L2 is set, automatic steering is started, and the forwarding direction of the tractor 1 (vehicle body 3) varies along the scheduled traveling line L2. For example, the front wheels 7F are steered to right when the current vehicle-body position is on the left side with respect to the scheduled traveling line L2, and the front wheels 7F are steered to left when the current vehicle-body position is on the right side with respect to the scheduled traveling line L2.

Note that during automatic steering, the traveling speed (vehicle speed) of the tractor 1 (vehicle body 3) can be changed by the operator manually changing the operation amount of an accelerator (accelerator pedal, accelerator lever) 210 (refer to FIG. 5) provided in the tractor 1 or changing the speed stage of the transmission 5 by using the speed-shift member (speed-shift lever, speed-shift switch) 211 (refer to FIG. 5).

Also, after automatic steering starts, the operator can terminate automatic steering when performing turn-off operation of the first steering switching member 54 or the second steering switching member 52 at any location. That is, the end point of the scheduled traveling line L2 can be set by terminating automatic steering with turn-off operation of the first steering switching member 54 or the second steering switching member 52. That is, the length from the start point to the end point of the scheduled traveling line L2 can be set longer or shorter than the traveling reference line L1. In other words, the scheduled traveling line L2 is not associated with the length of the traveling reference line L1, and the scheduled traveling line L2 allows traveling at a distance longer than the length of the traveling reference line L1 during automatic steering.

The correction switch 53 is a switch to correct the vehicle-body position (longitude and latitude) measured by the positioning device 40. That is, the correction switch 53 is a switch to correct the vehicle-body position (referred to as calculated vehicle-body position) calculated with a satellite signal (position of the positioning satellite, transmission time, correction information, and so forth) and measurement information regarding measurement items (acceleration and angular velocity) measured by the inertial measurement device 42.

For example, a pushable push switch defines and functions as the correction switch 53, and the correction amount is set based on the number of times of operation using the correction switch 53. The correction switch 53 has a first portion to issue an instruction for correction of the vehicle-body position corresponding to one width directional side, i.e., a left side, of the vehicle body 3, and a second portion to issue an instruction for correction of the vehicle-body position corresponding to the other width directional side, i.e., a right side, of the vehicle body 3. Every time the first portion is pushed, the correction amount corresponding to the left side of the vehicle body 3 (left correction amount) is incremented. Every time the second portion is pushed, the correction amount corresponding to the right side of the vehicle body 3 (right correction amount) is incremented.

Note that a slidable slide switch may define and function as the correction switch 53. In this case, the correction amount is set based on the operation amount of the correction switch 53.

For example, if an error occurs in positioning by the positioning device 40 due to various influences even though an actual position of the tractor 1 is not deviated with respect to the scheduled traveling line L2 and the vehicle-body position detected by the positioning device 40 is deviated rightward from the scheduled traveling line L2 (actual position) and the deviation amount is kept, the tractor 1 determines that a deviation occurs between the calculated vehicle-body position and the scheduled traveling line L2, and the tractor 1 is steered leftward so as to eliminate the deviation amount between the calculated vehicle-body position and the scheduled traveling line L2. Then, the actual position of the tractor 1 is shifted leftward from the scheduled traveling line L2. In this case, assume that the operator notices that the tractor 1 is deviated leftward from the scheduled traveling line L2 and operates the correction switch 53 to increment the right correction amount from zero. Then, the right correction amount is added to the calculated vehicle-body position, so that the vehicle-body position after correction (corrected vehicle-body position) becomes identical or substantially identical to the actual position. That is, by using the correction switch 53, the vehicle-body position by the positioning device 40 can be corrected so as to eliminate the occurring deviation amount. Also, by operating the correction switch 53, steering can be performed separately from the steering wheel 30. That is, the correction switch 53 also defines and functions as a steering member to steer the vehicle body 3.

Description has been made above to the case in which the vehicle-body position detected by the positioning device 40 deviates rightward from the scheduled traveling line L2. On the other hand, when the vehicle-body position detected by the positioning device 40 deviates leftward from the scheduled traveling line L2, the correction switch 53 is operated to increment the left correction amount from zero, thus adding the left correction amount to the calculated vehicle-body position and making the vehicle-body position after correction (corrected vehicle-body position) identical or substantially identical to the actual position.

While the first operation actuator 54 is a first steering switching member in the above description, this is not meant to be restrictive. For example, the first operation actuator 54 may be a correction switch (another correction switch) having the same function as that of the correction switch 53. That is, the correction switch 53 may be provided forward of the operator's seat 10 and another correction switch may be provided on a lateral side of the operator's seat 10. Also, the first operation actuator 54 may be a switch (another mode switch) having the same function as that of the mode switch 51 or a switch (another multi switch) having the same function as that of the multi switch 50. Also, a plurality of said first operation actuators 54 may be provided. In this case, the plurality of first operation actuators 54 include two or more switches from among the first steering switching member, another correction switch, another mode switch, and another multi switch.

As depicted in FIG. 5, the tractor 1 includes a plurality of controllers 60. The plurality of controllers 60 are configured or programmed to perform control over a traveling system, control over a working system, calculation of the vehicle-body position, and so forth in the tractor 1. The plurality of controllers 60 may include a first controller 60A, a second controller 60B, and a third controller 60C.

The first controller 60A receives a satellite signal (reception information) received by the receiver 41 and measurement information (acceleration and angular velocity) obtained by measurement by the inertial measurement device 42, and finds the vehicle-body position based on the received information and the measurement information.

Also, the first controller 60A includes a reference registering unit 150. The reference registering unit 150 includes an electric or electronic circuit provided in the first controller 60A, a program stored in a CPU or the like, and/or so forth. As described above, the reference registering unit 150 registers the traveling reference line L1, that is, sets the start point P10 and the end point P11. In a situation in which the tractor 1 is caused to travel by manual steering with the mode switch 51 undergoing turn-on operation, when the multi switch 50 is first operated to be pushed, the reference registering unit 150 sets the vehicle-body position as the start point P10 of the traveling reference line L1 and, next, when the multi switch 50 is operated to be pushed, sets the vehicle-body position as the end point P11 of the traveling reference line L1.

The second controller 60B includes an automatic steering control unit 200. The automatic steering control unit 200 includes an electric or electronic circuit provided in the second controller 60B, a program stored in a CPU or the like, and/or so forth. The automatic steering control unit 200 controls the steering motor 38 of the automatic steering mechanism 37 so that the vehicle body 3 travels along the scheduled traveling line L2.

Figure 7:
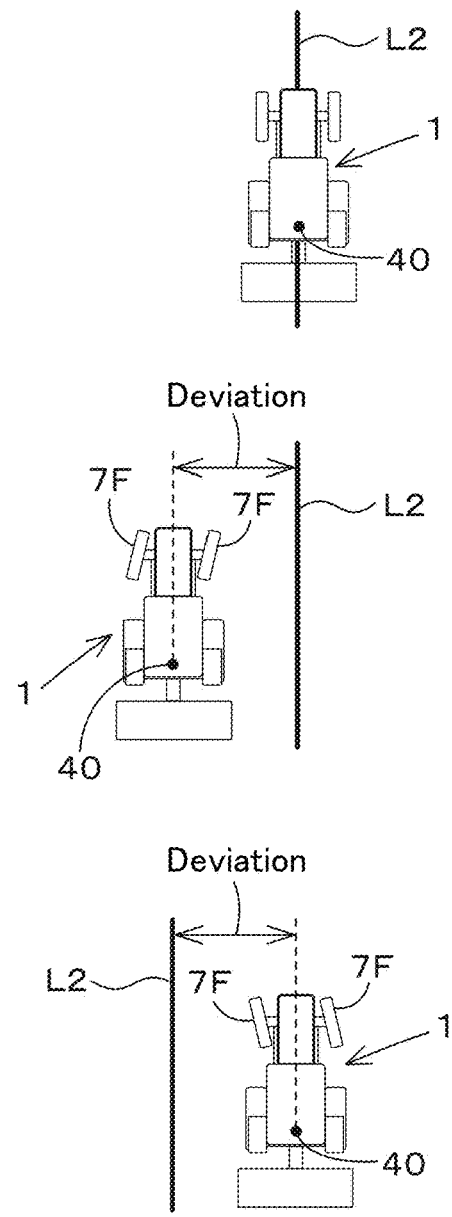
FIG. 7 is a descriptive diagram for describing the operation of automatic steering.

As depicted in FIG. 7, when the first steering switching member 54 or the second steering switching member 52 is operated to be turned on, the automatic steering control unit 200 sets the scheduled traveling line L2 parallel to the traveling reference line L1. After setting the scheduled traveling line L2, the automatic steering control unit 200 keeps the rotation angle of the rotation shaft of the steering motor 38 when a deviation between the vehicle-body position and the scheduled traveling line L2 is smaller than a threshold value. When the deviation (positional deviation) between the vehicle-body position and the scheduled traveling line L2 is equal to or larger than the threshold value and the tractor 1 is positioned on the left side with respect to the scheduled traveling line L2, the automatic steering control unit 200 rotates the rotation shaft of the steering motor 38 so as to steer the tractor 1 rightward. That is, the automatic steering control unit 200 sets a rightward steering angle such as to zero the positional deviation. When the deviation between the vehicle-body position and the scheduled traveling line L2 is equal to or larger than the threshold value and the tractor 1 is positioned on the right side with respect to the scheduled traveling line L2, the automatic steering control unit 200 rotates the rotation shaft of the steering motor 38 so as to steer the tractor 1 leftward. That is, the automatic steering control unit 200 sets a leftward steering angle such as to zero the positional deviation.

In the above-described preferred embodiment, the steering angle of the steering device 11 is changed based on the deviation between the vehicle-body position and the scheduled traveling line L2 in the above-described preferred embodiment. Alternatively, when the azimuth of the scheduled traveling line L2 and an azimuth (vehicle-body azimuth) F1 of the tractor 1 (vehicle body 3) in the forwarding direction (traveling direction) are different, that is, when an angle θg of the vehicle-body azimuth F1 with respect to the scheduled traveling line L2 is equal to or larger than a threshold value, the automatic steering control unit 200 may set a steering angle so that the angle θg becomes zero (the vehicle-body azimuth F1 matches the azimuth of the scheduled traveling line L2). Also, the automatic steering control unit 200 may set a final steering angle in automatic steering based on the steering angle calculated based on the deviation (positional deviation) and a steering angle calculated based on the azimuth (azimuth deviation). Setting of the steering angle in automatic steering in the above-described preferred embodiment is one example and is not meant to be restrictive.

Also, while the automatic steering being performed by the automatic steering control unit 200, when the accelerator 210 is operated, the second controller 60B changes the rotation speed of the prime mover 4 (prime mover rotation speed) in accordance with the operation amount of the accelerator 210. Also, while the automatic steering is performed by the automatic steering control unit 200, when the speed shift member 211 is operated, the second controller 60B changes the speed stage of the speed shifter 5.

The third controller 60C causes the coupling portion 8 to be lifted up and down in accordance with the operation of an operating member provided on the periphery of the operator's seat 10. Note that the first controller 60A, the second controller 60B, and the third controller 60C may be integrated. Also, the above-described control over the traveling system, control over the working system, and calculation of the vehicle-body position are not meant to be restrictive. As described above, by the controllers 60, the tractor 1 (vehicle body 3) can be automatically steered.

The above working vehicle 1 includes the operator's seat 10 on which the operator sits, the vehicle body 3 to travel selectively using either manual steering performed manually by the operator or automatic steering performed based on a vehicle-body position detected by a position detector without manual operation by the operator, and the first operation actuator 54 (first steering switching member) on the lateral side of the operator's seat 10 to perform an operation relating to the automatic steering.

According to this structure, since the first operation actuator 54 is on the lateral side of the operator's seat 10, the operator can easily perform operation relating to automatic steering even while looking rearward.

Also, the working vehicle may include the second operation actuator 83 in front of the operator's seat 10 to perform an operation relating to automatic steering.

According to this structure, the operation relating to automatic steering can be performed with either of the first operation actuator 54 on the lateral side of the operator's seat 10 and the second operation actuator 83 forward of the operator's seat 10.

Also, the first operation actuator 54 and the second operation actuator 83 may have the same function.

According to this structure, regardless of whether the operator faces forward to work or looks rearward to work, the same operation relating to automatic steering can be performed with either of the first operation actuator 54 and the second operation actuator 83.

Also, the first operation actuator 54 may selectively start or terminate automatic steering.

According to this structure, the operator can easily select either start or termination of automatic steering even while looking rearward.

Also, the first operation actuator 54 may be a correction switch to provide an instruction to correct the position of the vehicle 3 detected by the positioning device 40 (position detector).

According to this structure, the operator can easily perform correction of the position of the vehicle 3 even while looking rearward.

Also, the first operation actuator 54 may be rearward relative to the front end of the operator's seat 10 and forward relative to the rear end thereof.

According to this structure, the first operation actuator 54 can be easily operated at the time of working by turning rearward.

Also, the second operation actuator 83 may be disposed on an opposite side of the central portion of the operator's seat 10 relative to the first operation actuator 54.

According to this structure, since the first operation actuator 54 and the second operation actuator 83 are distributed left and right with respect to the operator's seat 10, for example, when the operation actuator 54 and the second operation actuator 83 are operation actuators having the same function, the operator can perform the same operation relating to automatic steering with either of the left hand and the right hand.

While preferred embodiments of the present invention have been described above, the preferred embodiments disclosed herein should be construed as being examples in all aspects and not being restrictive. The scope of the present invention is indicated not by the above description but by the scope of claims, and is intended to include all modifications in the scope of claims and the meanings and scopes of equivalents.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle, comprising:
an operator's seat on which an operator sits;
a steering wheel provided in front of the operator's seat;
a steering column provided below the steering wheel;
a vehicle body to travel selectively using either manual steering performed manually by the operator or automatic steering performed based on a position of the vehicle body detected by a position detector without manual operation by the operator;
a first operation actuator on a lateral side of the operator's seat to selectively start or terminate the automatic steering during rearward traveling of the vehicle body or to correct the position of the vehicle body during rearward traveling of the vehicle body; and
a second operation actuator to perform an operation relating to the automatic steering and operable to selectively start or terminate the automatic steering during rearward traveling of the vehicle body or to correct the position of the vehicle body during rearward traveling of the vehicle body; wherein
the first operation actuator is rearward relative to a front end of the operator's seat and forward relative to a rear end of the operator's seat; and
the second operation actuator is disposed on the steering column.

2. The working vehicle according to claim 1, further comprising:
a console on the lateral side of the operator's seat; and
an armrest between the console and the operator's seat; wherein
the console:
includes a front portion positioned outward of the steering wheel in a vehicle width direction, and a rear portion positioned outward of a rear portion of the operator's seat in the vehicle width direction; and
is located next to the armrest in the vehicle width direction; and
the first operation actuator is on an upper portion of the console and at a position higher than the armrest.

3. The working vehicle according to claim 2, wherein the first operation actuator is disposed outward in the vehicle width direction from a fore-and-aft central portion of the armrest or a vicinity thereof and is disposed at a fore-and-aft central portion of the console or a vicinity thereof.

4. The working vehicle according to claim 1, wherein
the first operation actuator is positioned outward of a fore-and-aft central portion of a seat portion in a vehicle width direction or in a vicinity thereof; and
the seat portion is a portion of the operator's seat on which the operator is to sit.

5. The working vehicle according to claim 1, wherein the second operation actuator is on an opposite side of a central portion of the operator's seat relative to the first operation actuator.

6. The working vehicle according to claim 1, wherein the first operation actuator is operable to selectively start or terminate the automatic steering during forward traveling of the vehicle body or to correct the position of the vehicle body during forward traveling of the vehicle body.

* * * * *